(12) United States Patent
Kim et al.

(10) Patent No.: US 9,971,184 B2
(45) Date of Patent: May 15, 2018

(54) LIQUID CRYSTAL DISPLAY DEVICE INCLUDING NANOCAPSULE LIQUID CRYSTAL LAYER

(71) Applicants: LG Display Co., Ltd., Seoul (KR); Imagelab Co., Ltd., Seongnam-si, Gyeonggi-do (KR)

(72) Inventors: Kyeong-Jin Kim, Goyang-si (KR); Min-Geun Choi, Paju-si (KR); Kyung-Su Ha, Gwangju (KR); Hyun-Ha Hwang, Seoul (KR); Seung-Gon Kang, Hwaseong-si (KR)

(73) Assignees: LG DISPLAY CO., LTD., Seoul (KR); IMAGELAB CO., LTD., Seongnam-si (KR)

( * ) Notice: Subject to any disclaimer, the term of this patent is extended or adjusted under 35 U.S.C. 154(b) by 148 days.

(21) Appl. No.: 14/979,060

(22) Filed: Dec. 22, 2015

(65) Prior Publication Data
US 2016/0178941 A1 Jun. 23, 2016

(30) Foreign Application Priority Data
Dec. 23, 2014 (KR) ........................ 10-2014-0187166

(51) Int. Cl.
*G02F 1/1334* (2006.01)
*C09K 19/54* (2006.01)
*C09K 19/42* (2006.01)

(52) U.S. Cl.
CPC .......... *G02F 1/1334* (2013.01); *C09K 19/544* (2013.01); *C09K 19/42* (2013.01); *G02F 2202/36* (2013.01)

(58) Field of Classification Search
CPC . G02F 1/1334; G02F 2202/36; C09K 19/544; C09K 19/38; C09K 19/3809;
(Continued)

(56) References Cited

U.S. PATENT DOCUMENTS 8,012,579 B2 * 9/2011 Harada ................... G02F 1/132
398/172

FOREIGN PATENT DOCUMENTS

KR 10-2013-0047649 A 5/2013
KR 10-1269870 B1 6/2013

OTHER PUBLICATIONS

English translation of KR20130047649, cited in IDS. Translation downloaded from https://patents.google.con on Jul. 13, 2017; translation provided by Google Translate tool on site.*

(Continued)

*Primary Examiner* — Angela Davison
(74) *Attorney, Agent, or Firm* — Birch, Stewart, Kolasch & Birch, LLP

(57) ABSTRACT

Discussed is a liquid crystal display device that includes a substrate having a pixel electrode and a common electrode formed thereon, a first polarizing plate on a bottom surface of the substrate, and having a polarizing axis of a first direction, a nanocapsule liquid crystal layer on the pixel electrode and the common electrode, and including a buffer layer and nanocapsules, each nanocapsules being filled with liquid crystal molecules, being oil-soluble, and being dispersed in the buffer layer, and a second polarizing plate on the nanocapsule liquid crystal layer, and having a polarizing axis of a second direction perpendicular to the first direction.

16 Claims, 3 Drawing Sheets

(58) Field of Classification Search
CPC ........................ C09K 19/3814; C09K 19/3885;
C09K 19/42; C09K 19/46; C09K 19/52
USPC ........................................ 349/86, 89, 90, 91
See application file for complete search history.

(56) References Cited

OTHER PUBLICATIONS

Article in IDS: Kang, Seung-Gon and Kim, Jae-Hoon. "Optically-isotropic Nanoencapsulated Liquid Crystal Displays Based on Kerr Effect." Optics Express Jul. 1, 2013; vol. 21, No. 13. Published Jun. 24, 2013.*
Kang et al., "Optically-isotropic nanoencapsulated liquid crystal displays based on Kerr effect", Optics Express, vol. 21, No. 13, Jul. 1, 2013 (published Jun. 24, 2013), 9 pages.

* cited by examiner backlight(60)

LIQUID CRYSTAL DISPLAY DEVICE INCLUDING NANOCAPSULE LIQUID CRYSTAL LAYER

CROSS-REFERENCE TO RELATED APPLICATION

This application claims the benefit of Korean Patent Application No. 10-2014-0187166, filed on Dec. 23, 2014, which is hereby incorporated by reference for all purposes as if fully set forth herein.

BACKGROUND OF THE INVENTION

Field of the Invention

Embodiments of the present invention relate to a liquid crystal display device (LCD) including a nanocapsule liquid crystal layer.

Discussion of the Related Art

Liquid crystal displays (LCDs), which are widely used for TV (television), monitor or the like because of advantage in display moving images and high contrast ratio, displays images through image display principle by optical anisotropy and polarization of liquid crystals.

An LCD includes a liquid crystal panel as a main component which is manufactured by coupling two substrates with a liquid crystal layer therebetween, and changes alignment of liquid crystal molecules by an electric field and displays difference of transmittance.

The liquid crystal panel requires a light source, and so a backlight is located below the liquid crystal panel.

FIG. 1 is a cross-sectional view illustrating an LCD according to a related art.

Referring to FIG. 1, the LCD includes a liquid crystal panel 10 including an array substrate, a color filter substrate and a liquid crystal layer 50 between the array substrate and the color filter substrate, and a backlight unit 60 below the liquid crystal panel 10. A first substrate 2 referred to as the array substrate includes a pixel region P, and on an inner surface of the first substrate 2, a thin film transistor T is in each pixel region P and connected to a pixel electrode 28 in each pixel region P.

On an inner surface of a second substrate 4 referred to as the color filter substrate, a black matrix 32 is formed in a lattice shape surrounding the pixel region P to cover a non-display element such as the thin film transistor T and exposes the pixel electrode 28.

Red, green and blue color filters 34 are formed in the lattice shape corresponding to the respective pixel regions P, and a common electrode 36 is formed on the black matrix 32 and the color filters 34.

First and second polarizing plates 20 and 30 are attached onto outer surfaces of the first and second substrates 2 and 4, respectively.

First and second alignment layers 31a and 31b are formed between both the pixel electrode 28 and the common electrode 36, and the liquid crystal layer 50. The first and second alignment layers 31a and 31b are rubbed and align liquid crystal molecules.

A seal pattern 70 is formed between and along peripheral regions of the first and second substrates 2 and 4 and prevents leakage of the liquid crystal.

The backlight unit 60 is located below the liquid crystal panel 10 and supplies light to the liquid crystal panel 10.

Recently, in order to provide an LCD having an improved response speed, an LCD including a nanocapsule liquid crystal, in which nematic liquid crystal molecules are capsuled by a nanocapsule, have been actively researched.

Since the nanocapsule liquid crystal layer does not need initial alignment, the alignment layers are not required and thus an alignment process such as rubbing is not required.

Further, since the nanocapsule liquid crystal layer is formed to be hardened, when the color filters and the common electrode are formed on the first substrate, the second substrate can be eliminated.

Accordingly, a process of forming a gap for an interval for injecting the liquid crystal layer between the first and second substrates can be omitted, and a process of forming the seal pattern to seal the liquid crystal layer is omitted. Thus, production efficiency can be improved.

However, the nanocapsule liquid crystal layer is weak to moisture. Particularly, when the second substrate is omitted, the nanocapsule liquid crystal layer is directly exposed to the outside, thus moisture is penetrated into the nanocapsule liquid crystal layer, and thus reliability of the LCD including the nanocapsule liquid crystal layer is reduced.

When the reliability is reduced, voltage holding ratio is also reduced. Due to the reduction of the voltage holding ratio, a time to maintain position of a liquid crystal molecule transmitting light is reduced, and thus light transmittance is reduced. This causes reduction of overall brightness of the LCD, or a flicker phenomenon.

SUMMARY OF THE INVENTION

Accordingly, the embodiments of the present invention are directed to a liquid crystal display device (LCD) including a nanocapsule liquid crystal layer that substantially obviates one or more of the problems due to limitations and disadvantages of the related art.

An advantage of the embodiments of the present invention is to provide an LCD including a nanocapsule liquid crystal layer that can prevent reduction of reliability and reduction of brightness, and improve production efficiency.

Additional features and advantages of the embodiments of the present invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a substrate having a pixel electrode and a common electrode formed thereon, a first polarizing plate on a bottom surface of the substrate and having a polarizing axis of a first direction, a nanocapsule liquid crystal layer on the pixel electrode and the common electrode, and including a buffer layer and nanocapsules, each nanocapsules being filled with liquid crystal molecules, being oil-soluble, and being dispersed in the buffer layer, and a second polarizing plate on the nanocapsule liquid crystal layer, and having a polarizing axis of a second direction perpendicular to the first direction.

Also, a liquid crystal display device includes: a substrate having a pixel electrode and a common electrode formed thereon; a non-liquid layer on the substrate, and including a buffer layer and nanocapsules, each nanocapsule being filled with liquid crystal molecules, being oil-soluble, and being dispersed in the buffer layer; and a polarizing plate on the non-liquid layer.

It is to be understood that both the foregoing general description and the following detailed description are example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to example embodiments, examples of which are illustrated in the accompanying drawings. The same reference numbers may be used throughout the drawings to refer to the same or like parts.

First Embodiment

Figure 2:
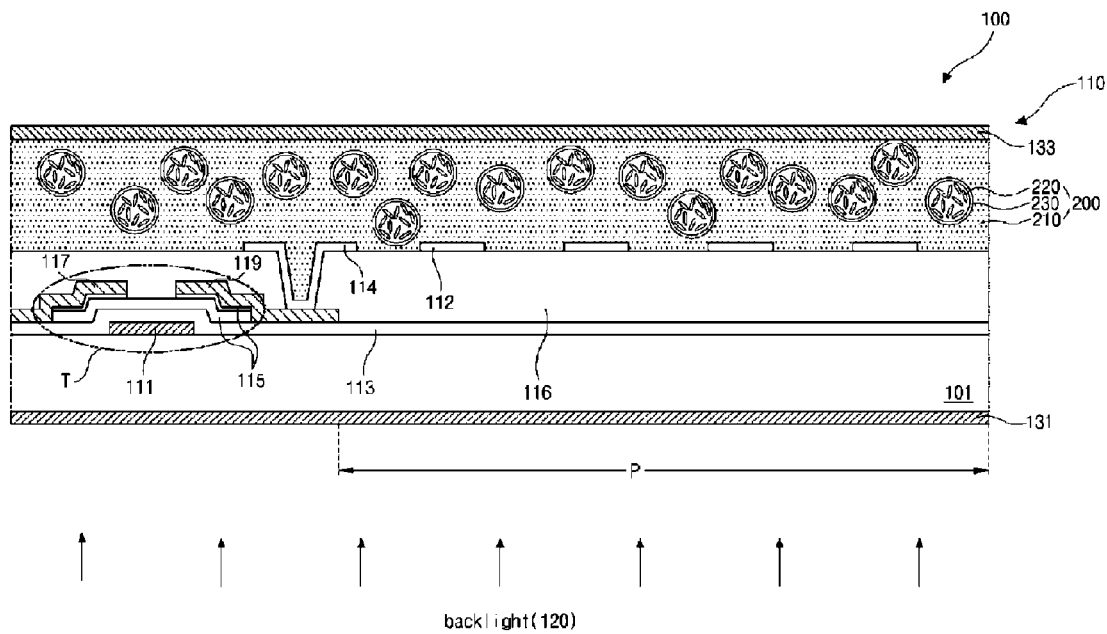
FIG. 2 is a schematic cross-sectional view illustrating an LCD according to a first embodiment of the present invention.
Figure 3A:
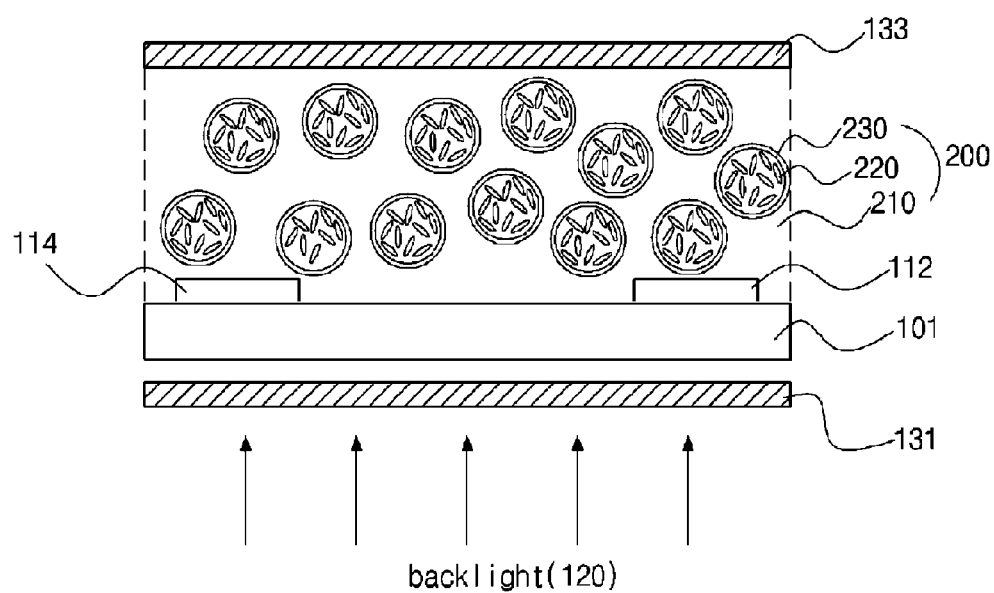
FIGS. 3A and 3B are schematic views illustrating an image display principle of the LCD according to the first embodiment of the present invention.
Figure 3B:
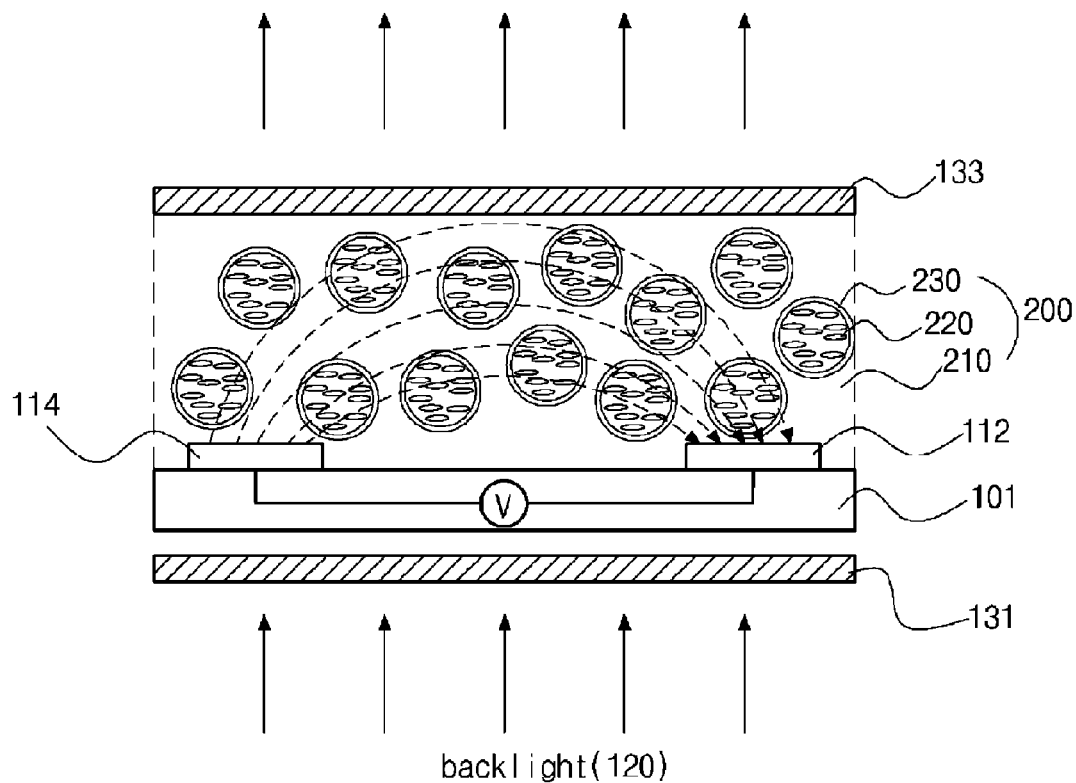

FIG. 2 is a schematic cross-sectional view illustrating an LCD according to a first embodiment of the present invention, and FIGS. 3A and 3B are schematic views illustrating an image display principle of the LCD according to the first embodiment of the present invention.

Referring to FIGS. 2 to 3B, the LCD 100 includes a liquid crystal panel 110 and a backlight 120.

The liquid crystal panel 110 is a main component to display images, and includes a nanocapsule liquid crystal layer 200 on a substrate 101. In embodiments of the invention, the nanocapsule liquid crystal layer 200 may be a non-liquid layer or a hardened layer.

In the nanocapsule liquid crystal layer 200, liquid crystal molecules 200 are capsuled by a nanocapsule 230 having a nanosize or nanoscale. The liquid crystal molecules 220 are randomly arranged in the nanocapsule 230. The nanocapsules 230 each including the liquid crystal molecules 220 therein are dispersed in a buffer layer 210. The nanocapsule liquid crystal layer 200 changes light transmittance to display images.

The nanocapsule liquid crystal layer 200 is an optically isotropic type liquid crystal layer. Accordingly, when no electric field is applied to the nanocapsule liquid crystal layer 200 between a pixel electrode 114 and a common electrode 112, the nanocapsule liquid crystal layer 200 is optically isotropic in three dimensions or two dimensions. However, when a voltage is applied and thus an electric field is applied, the nanocapsule liquid crystal layer 200 has a birefringence property in a direction perpendicular to or parallel with the applied electric field.

Accordingly, when an electric field is applied, the nanocapsule liquid crystal layer 200 has an optically uniaxial property, with light transmittance being dependent upon viewing angles.

Particularly, when the liquid crystal molecules 220 are positive type liquid crystal molecules having a positive dielectric anisotropy, a kerr effect can be greatly induced. The kerr effect refers to a phenomenon that an optically isotropic object temporarily has non-isotropy and changes to a birefringent material when being placed in an electrostatic field.

Accordingly, by the kerr effect, when an electric field is applied to the liquid crystal layer 200, an optical effect is shown in which a refractive index is proportional to a square of an applied voltage. Thus, a response speed of a display device is improved.

Particularly, as the kerr effect is greater, there are more advantages in view of the driving voltage. To make the kerr effect great, it is preferable that both of a refractive anisotropy and a dielectric anisotropy of the liquid crystal are great, for example.

Accordingly, it is preferable that a refractive anisotropy is 0.2 or greater, and a dielectric anisotropy is 10 or greater, for example.

The nanocapsule 230 may have a diameter of about 1 nm to about 320 nm, and preferable, about 50 nm to about 180 nm, for example.

Because the nanocapsule 230 has a diameter less than any wavelengths of visible light, there occurs substantially no optical change due to a refractive index, and an optical isotropic property can be obtained. Further, scattering of visible light can be minimized.

Particularly, when the nanocapsule 230 is formed with a diameter of about 180 nm or less, high contrast ratio can be obtained.

In order to control a transmittance of the nanocapsule liquid crystal layer 200, first and second polarizing plates 131 and 133 are arranged such that polarizing axes thereof are perpendicular to each other, and an electric field is in an in-plane direction of the substrate 101 (i.e., a horizontal direction).

Accordingly, it is preferable that the LCD 100 including the nanocapsule liquid crystal layer 200 has an electrode structure for an in-plane switching mode, for example.

To do this, gate and data lines crossing each other to define a pixel region P are formed on an inner surface of the substrate 101 referred to as an array substrate. A thin film transistor T is formed at a crossing portion of the gate and data lines.

The substrate 101 is a thin plate made of a transparent material. For example, the substrate 101 may be a glass substrate, or a plastic substrate having flexibility.

When the plastic substrate is used, it is preferably made of a material having a excellent light transmission and no birefringence, for example. This plastic substrate may be made of at least one of tri acetyl cellulose (TAC), polyimide (PI), polyethersulfone (PES), polyethylene terephthalate (PET), polyethylene naphthalate (PEN) and polyarylate (PAR).

A planarization layer 116 is formed on the substrate 101 having the thin film transistor T. The pixel electrodes 114 connected to the thin film transistor T and the common electrodes 112 spaced apart from the pixel electrodes 114 are formed on the planarization layer 116 in a display region to substantially display images.

The thin film transistor T includes a gate electrode 111, a gate insulating layer 113, a semiconductor layer 115, and source and drain electrodes 117 and 119.

The pixel electrodes 114 each have a bar shape and are spaced apart from each other in each pixel region P. A common line is parallel with the gate line and is located at the same layer as the gate line. The common electrodes 112 alternate with the pixel electrodes 114 in the pixel region P and are electrically connected to the common line.

Alternatively, a pixel electrode may have a plate shape in each pixel region while a common electrode may be located at a layer different from the pixel electrode and have a bar shape. Alternatively, a pixel electrode may have a bar shape in each pixel region while a common electrode may be located at a layer different from the pixel electrode and have a plate shape.

A black matrix may be formed on the thin film transistor T with the planarization layer 116 therebetween and have a lattice shape to expose each pixel region P, and red, green and blue color filters may be formed on respective pixel regions P and be arranged alternately.

The backlight 120 may be categorized into a side type and a direct type. In an instance of the side type backlight, at least one light source is located on a side surface of a light guide plate below the liquid crystal panel 110. In an instance of the direct type backlight, at least one light source is located below the liquid crystal panel 110.

As the light source, a cold cathode fluorescent lamp (CCFL), an external electrode fluorescent lamp (EEFL), or a light emitting diode (LED) may be used.

In the LCD 100, an optical axis of the first polarizing plate 131 may be perpendicular to an optical axis of the second polarizing plate 133, and the optical axes of the first and second polarizing plates 131 and 133 makes a 45 degrees angle with the pixel and common electrodes 114 and 112.

The reason is that when the electrodes of the in-plane switching mode induce an in-plane field, the birefringence value ($\Delta n$) of the liquid crystal layer 200 produced by the kerr effect becomes greatest in the instance that the optical axes of the first and second polarizing plates 131 and 133 make a 45 degrees angle with the electrodes of the in-plane switching mode.

Referring to FIG. 3A, when there is no voltage difference between the pixel electrode 114 and the common electrode 112, the liquid crystal molecules 220 are arranged randomly, and the liquid crystal molecules 220 and the nanocapsule 230 have different refractive anisotropies from each other. Further, the nanocapsule 230 has a size less than any wavelengths of visible light. Accordingly, optically isotropic property is obtained.

Consequently, a light emitted from the backlight unit 160 and passing through the first polarizing plate 131 reaches the second polarizing plate 133 without change of polarization. This light is absorbed by the second polarizing plate because the first and second polarizing plates 131 and 133 have polarizing axes perpendicular to each other. Thus, a black (or a black background) is displayed.

Referring to FIG. 3B, when there is a voltage difference between the pixel electrode 114 and the common electrode 112 to produce an in-plane electric field, the liquid crystal molecules 220 are uniformly arranged along the electric field, and polarization of light passing through the liquid crystal layer 200 is changed because of the birefringence produced by the kerr effect. Accordingly, all of this light is not absorbed by the second polarizing plate 133 and at least part of the light passes through the second polarizing plate 133. Thus, a grey or white (or a non-black) is displayed.

The LCD 100 as above is operated normally in a black mode (e.g., a black background). Accordingly, the LCD 100 including the nanocapsule liquid crystal layer 200 can be used as a display device, with its transmittance changing according to a variation of the voltage applied.

Further, since the nanocapsule liquid crystal layer 200 does not have an initial alignment to be optically anisotropic, alignment of liquid crystal molecules may not be required, and thus no alignment layer may be needed in the LCD 100, and also, processes for forming an alignment layer such as rubbing may not be needed.

Figure 1:
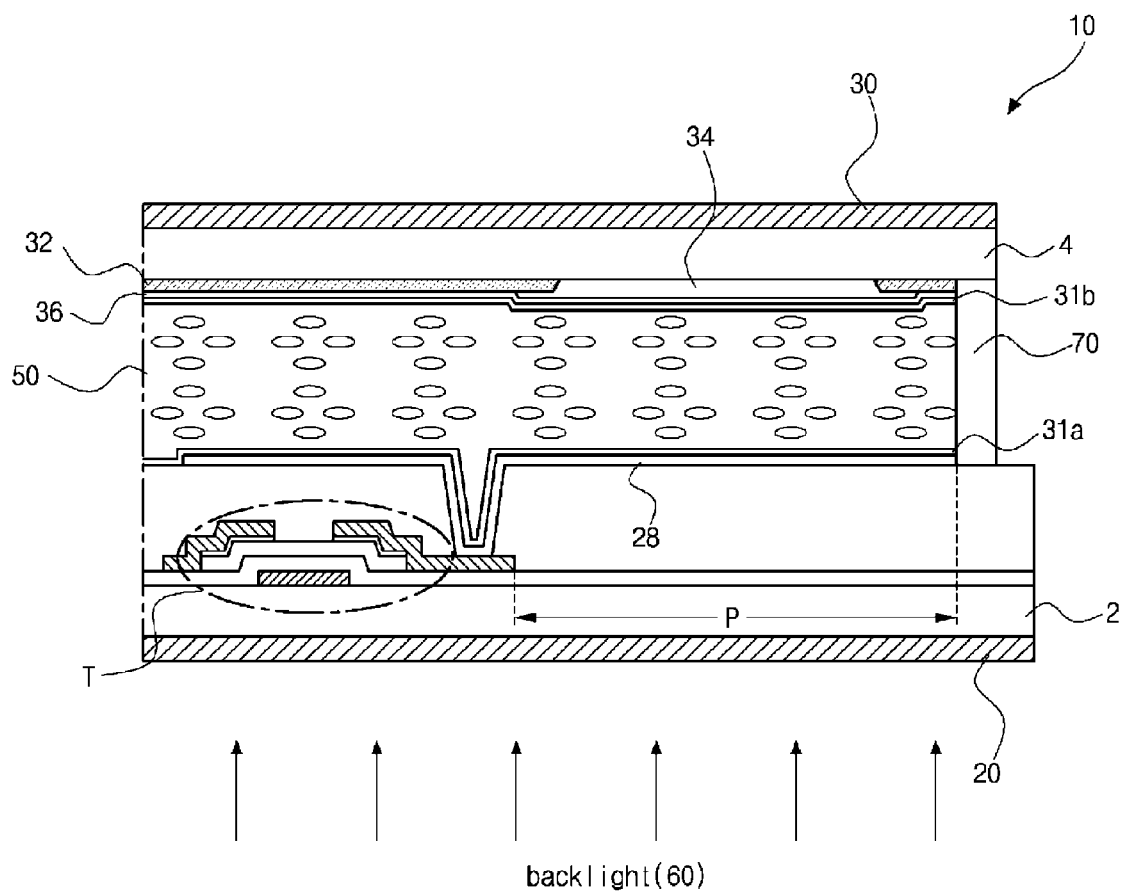
FIG. 1 is a cross-sectional view illustrating an LCD according to the related art.

Further, since the nanocapsule liquid crystal layer 200 is provided in a hardened state, an opposing substrate (i.e., the second substrate 4 of FIG. 1) facing the substrate 101 can be eliminated.

By eliminating the opposing substrate, a total thickness of the liquid crystal panel 110 can be reduced, the LCD 100 having thin profile and being lightweight can be provided, and the LCD can be applied or provided as a flexible display device.

Further, a process of forming a gap between the substrate 101 and the opposing substrate filled with the liquid crystal layer in the related art can be eliminated, and a process of forming the seal pattern in the related art can be eliminated. Therefore, production efficiency can be improved.

Further, even when an external force is applied to the LCD 100 of the embodiment, the liquid crystal molecules 220 are in the nanocapsule 230 having a size less than the wavelength of visible light, thus there is substantially no influence of visible light, and thus light leakage due to the external force can be reduced or prevented.

Accordingly, in the instance that the LCD 100 of the embodiment is applied as a flexible display device, even when a bending force is applied to the LCD, because of the nanocapsule 230 having a size less than the wavelength of visible light, light leakage due to the bending force can be reduced or prevented.

Particularly, the nanocapsule liquid crystal layer 200 has a property of being strong or resistant to moisture. Accordingly, even when moisture is penetrated from the outside, reduction of reliability of the LCD 100 can be prevented.

This is because the nanocapsule 230 has an oil solubility, or the buffer layer 210 has an oil solubility.

Particularly, in the instance that the oil-soluble nanocapsule 230 is dispersed in the oil-soluble buffer layer 210, even when moisture is penetrated from the outside, reliability of the LCD 100 can be further improved.

The oil-soluble nanocapsule 230 may be formed using an interfacial polymerization method, an in-situ polymerization method, a solvent evaporation method or the like. The method of forming the nanocapsule 230 is explained in more detail as below.

First, by the interfacial polymerization method, the oil-soluble nanocapsule 230 may be made of polyurethane or polyurea. The polyurethane or polyurea is made by reaction of polyisocyanate with at least one of polyol or polyamine.

Polyisocyanate is categorized into aromatic series and aliphatic series. Since polyisocyanate has a high cross-linking property, it is suitable as a material for the oil-soluble nanocapsule 230. It is preferable that polyisocyanate has 2 to 8 isocyanate (—NCO) groups, and preferably, 2 to 3 isocyanate (—NCO) groups, for example.

Polycyanate may use Desmodur N-100, N-3200, N-3300, or N-3390 of Bayer corporation. A material having three isocyanate groups other than Desmodur N-100, N-3200, N-3300, or N-3390 of Bayer Corporation, is a by-product of trimethylolpropane, or HDI (1,6-hexamethylene diisocyanate).

A material having two isocyanate groups is HMDI (1,6-hexamethylene diisocyanate), IPDI (isophorone diisocyanate), or TDI (toylene diisocyanate). Further, a material having two isocyanate groups is Takenate 500(XDI), 600 (H6XDI), D-110N(XDI Adduct), or D-120N(H6XDI Adduct) as a Takenate series of Mitsui Chemicals.

Since polyol has at least two alcohol groups, it has a water solubility. Polyol may be diol, triol, or dithiol. Polyol may be selected from diethylene glycol, 2,2'-thiodiethanol, 2-mercaptoethyl sulfide, 2-mercaptoethyl ether, triethylene glycol, 2-methylpropane-1,3-diol, 2-ethylpropane-1,3-diol, 2-n-propylpropane-1,3-diol, 2-n-butylpropane-1,3-diol, 2-methyl 2-n-butylpropane-1,3-diol, diethanolamine, triethanolamine, N-n-butyldiethanolamine, N-ethyldiethanolamine, N-methyldiethanolamine, tris(hydroxymethyl) aminomethane, trimethylolpropane, pentaerythritol, 1,4-butanediol, 1,6-hexanediol, 2,2-bis (hydroxymethyl) propionic acid, dimethylolmelamine, trimethylolmelamine, hexamethylolmelamine, 1,4 cyclohexanedimethanol, glycerol, or a mixture thereof.

Polyamine is categorized into high-molecular weight polyamine and low-molecular weight polyamine. High-molecular weight polyamine is polylysine, Hoffmann-modified polyacrylamide, polyvinylamine, polyamidine, polyallylamine, or the like. Among theses, polyallylamine may be preferably used, for example. An average molecular weight of high-molecular weight polyamine is preferably between 3,000 and 500,000, and more preferably, between 10,000 and 10,000, for example.

Low-molecular weight polyamine is hydrazine, 1,2-ethylene diamine, 1,3-propane diamine, 1,4-butane diamine, 1,5-pentane diamine, 1,6-hexane diamine, diethylene triamine, triethylene tetramine, tetraethylene pentamine, urea, carbohydrazine, or 1,3-diaminobenzene. Among theses, ethylene diamine is most widely used.

An average molecular weight of low-molecular weight polyamine is preferably between 32 and 300, and more preferably, between 50 to 200, for example.

When forming the nanocapsule 320 using the interfacial polymerization method, an emulsifying agent may be further added. The emulsifying agent may use polyvinylpyrrolidone, carboxymethyl cellulose, gum arabic, or gelatin.

Among these, polyvinylpyrrolidone having the most emulsifying capacity is preferably used, and in this instance, a concentration thereof is preferably 1 wt % to 25 wt %, and more preferably 1 wt % to 5 wt %, for example.

A mechanism of forming the nanocapsule 230 having an oil-solubility using the interfacial polymerization method is explained below.

Below synthetic formulas (1) to (4) show how chemical reactions happen in a state that polyisocynate, polyamine, polyol, and water exist.

R1-NCO(polyisocyanate)+H$_2$O→R1-NHCOOH(carbamic acid)→R1-NH$_2$(amine)+CO$_2$↑.  Synthetic formula (1):

Polyamine and polyol can be formed using the below synthetic formulas (2) to (4) with R1-NHCOOH and R1-NH$_2$ obtained by the above synthetic formula (1).

R1-NCO+R1-NHCOOH→R1-NHCONH—R1(polyurea)+CO$_2$↑.  Synthetic formula (2):

Synthetic formula (3):

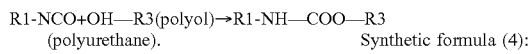
Synthetic formula (4):

In the formula (1) to (4), R1 is a part other than isocyanate (—NCO) in polyisocyanate. For example, when polyisocyanate is xylene diisocyanate, R1 is OCN—CH$_2$—C$_6$H$_4$—CH$_2$—; when polyisocyanate is 1,6-hexane diisocyanate, R1 is OCN—(CH$_2$)$_6$—; and when polyisocyanate is 4,4'-diphenylmethane diisocyanate, R1 is OCN—C$_6$H$_4$—CH$_2$—C$_6$H$_4$—.

R2 is a part other than amino group in polamine. For example, when polyamine is ethylenediamine, R2 is H$_2$N—CH$_2$CH$_2$—; and when polyamine is ethylenetriamine, R2 is H$_2$N—CH$_2$CH$_2$—NH—CH$_2$CH$_2$—.

R3 is a part other than —OH in polyol. For example, when polyol is 1,6-hexane diol, R3 is HO(CH$_2$)$_6$—; and when polyol is trimethylolpropane, R3 is CH$_3$CH$_2$C (CH$_2$OH)—CH$_2$—.

When the nanocapsule 230 having polyurethane and polyurea or polyurea through the above chemical reactions is formed, polyisocyanate dissolves in liquid crystal of oil phase because of its oil-solubility, polyol or polyamine having a water solubility dissolves in an aqueous phase, and then emulsification is performed. This is explained below in more detail.

A first step of mixing the liquid crystal 220 and polyisocyanate to form an oil phase, a second step of emulsifying the oil phase in an aqueous phase including an emulsifying agent to produce an O/W (oil in water) emulsion, and a third step of adding high-molecular weight polyamine and low-molecular weight polyamine to the emulsified solution are conducted. In the third step, polyol may be added.

Then, a fourth step of applying heat to the emulsified mixed solution and producing a chemical reaction to polyurea or polyurethane/polyuria nanocapsule 230.

In the first step, the liquid crystal molecule 220 mixed with polyisocyanate is a nematic, cholesteric, or smectic liquid crystal molecule, and preferably, a nematic liquid crystal molecule that is advantageous in producing induced birefringence due to property of nature such as a refractive anisotropy (Δn) and a dielectric anisotropy (Δ∈), for example.

An additive or surfactant may be added to the liquid crystal, and this may have an effect of reducing a driving voltage of a liquid crystal.

As an additive, ethylene oxide polymer and oligomer, or ethylene oxide copolymer and propylene oxide polymer may be used.

As ethylene oxide polymer and oligomer, there is poly (ethylene glycol) of PEG-400 or PEG-8000 (HO (CH$_2$CH$_2$O)nH, n is between 10 and 200) named as Carbowax™ and distributed by Union Cabide corporation; alkylphenyl terminated ethylene oxide polymer of Igepal CO-210, Igepal CO-420, or Igepal CO-430 named as Igepal™ and distributed by GAF corporation; tri(ethylene glycol); tetra(ethylene glycol); tergitol 15-S, or tergitol TMN-3 named as Tergitol™ and distributed by Union Cabide corporation; or diol-based ethoxylated alcohol named as Surfynol™ and distributed by Air Products corporation.

As ethylene oxide copolymer, there is Tetronic 702, or Tetronic 704 named as Tetronic™ and distributed by BASF corporation; Pluronic 10R5, Pluronic P103, Pluronic L62, Pluronic L44, Pluronic L122, Pluronic L121, or Pluronic 31R1 named as Pluronic™ and distributed by BASF corporation; ethylene oxide-propylene oxide block copolymer of Voranol 5287, Voranol 2103, or Voranol 3137 named as Voranol™ and distributed by Dow Chemical corporation; silicone poly(ethylene oxide) graft copolymer of Silwet L7614, Silwet L7607, or Silwet L77 named as Silwet™ and distributed by Union Carbide corporation; or tetrafluoroethylene-ethylene oxide copolymer of Zonyl FSN named as Zonyl™ and distributed by Du Pont corporation.

As propylene oxide polymer, there is polypropylene glycol of Niax polyol PPG425 named as Niax™ and distributed by Union Carbide corporation, or acetylene glycol of Surfynol 104, 104H, 82, 124, SE, or SE-F named as Surfynol™ and distributed by Air Product corporation.

As another additive, there is long-chain alkyl ester of polyol such as sorbitan monolaurate or sorbitan trioleate of Span-80 or Span-85 named as Span™ and distributed by ICI America corporation, glycerol mono-oleate, triglycerol diisostearate, or the like.

The above additives are used singly or in mixture of at least two thereof.

The in-situ polymerization method as an another method to form the oil-soluble nanocapsule 230 may be conducted as follows: monomers dissolved in aqueous solution increase in molecular weight and are established as oligomer or polymer at an interface of an emulsified organic phase and an aqueous solution.

The oligomer or polymers located at the interface have greater molecular weight by cross-linking reaction to thus form a solid nanocapsule 230.

This method is relatively simple and forms the nanocapsule 230 at a low temperature. Amino resin such as urea or melamine may be used as a material of the nanocapsule 230 in this method.

Since the urea and melamine have partial polarity structure, polymer formed by polymerization has excellent property in chemical stability such as thermal stability, solvent resistance and the like.

The oil-soluble nanocapsule 230 may be formed using the solvent evaporation method, in which polymer to form the nanocapsule 230 is dissolved in a solvent, then is dispersed in a solution or solid that becomes a core material to conduct emulsification in an aqueous solution.

Then, a large quantity of dispersion medium not mixed with a solvent is added to the emulsified solution to evaporate the original solvent, and polymer dissolved in the solvent is precipitated at an interface of a droplet to form the nanocapsule 230.

As the polymer to form the nanocapsule 230 in the solvent evaporation method, polymethyl methacrylate (PMMA) is used, which is excellent in water resistance and transmissivity.

The solvent may be selected from water, ethanol, acetone, methylene chloride, chloroform, ethyl acetate, or the like.

When using the solvent in small quantity, a polymer solution increases in concentration, becomes a solution having a high viscosity, and is reduced in dispersibility. Accordingly, aggregation of dispersed particles happens, and it is difficult to adjust the size of the dispersed particles.

In contrast, when a polymer solution in low concentration is formed using the solvent in large quantity, an evaporation time of solvent increases, and process time is long. Thus, a solvent preferably has a centration of about 5 wt % to 20 wt %, for example.

The buffer layer 210 of the nanocapsule liquid crystal layer 200 should have good dispersibility with the nanocapsule 230, good adhesion with the substrate 101, excellent light transmittance, and excellent electric insulation.

Further, the buffer layer 210 is should have an isotropic refractive property, and a refractive index that is not much different from that of an average refractive index of the liquid crystal in the nanocapsule 230. Particularly, the buffer layer 210 may be formed of a resin binder to have an oil solubility.

The resin binder is selected from acrylic resin, polyester resin, fluorocarbon polymer, alkyd resin, amino resin, vinyl resin, epoxy resin, polyimide resin, urethane resin, unsaturated polyester resin, phenol resin, polyolefin resin, silicone resin, acrylic-silicone resin, xylene resin, ketone resin, rosin-modified maleic acid resin, liquid polybutadiene, or kumarone resin.

Among these resin binders, the acrylic resin is preferable, and among acrylic resins, methacrylic resin is more preferable, for example.

The buffer layer 210 may be formed using a waterborne (or water-dispersible) binder, or an emulsion type binder. The emulsion type binder is selected from alkyl (meth) acrylate copolymer dispersions), vinyl acetate resin emulsions, vinyl acetate copolymer resin emulsions, ethylene-vinyl acetate copolymer resin emulsions, acrylic acid ester (co)polymer resin emulsions, styrene acrylic acid ester (co) polymer resin emulsions, epoxy resin emulsions, urethane resin emulsions, acrylic-silicone emulsions, or fluorocarbon polymer emulsions.

The waterborne binder is a polyurethane binder, and may be formed of dispersing polyurethane of water-insoluble property in water using an emulsifying agent.

A process of forming the waterborne binder is categorized into an acetone process, a prepolymer mixing process, and a melt dispersion process, and among these, the prepolymer mixing process is most widely used.

The waterborne binder coupled with at least one acrylics, polyesters, polycarbonates, or silicones may be used.

The waterborne binder and the emulsion type binder go through a process of eliminating moisture by a drying process.

Further, the buffer layer 210 may be formed to include a water-soluble binder with an oil-soluble material such as a resin binder. The water-soluble binder is reacted with the oil-soluble material and changes in property of matter, and the buffer layer 210 can be formed to be oil soluble overall.

In this instance, the water-soluble binder is selected from polyvinyl alcohol (PVA), water-soluble alkyd resin, water-soluble acryl-modified alkyd resin, water-soluble oil-free alkyd resin (water-soluble polyester resin), water-soluble acrylic resin, water-soluble epoxy ester resin, or water-soluble melamine resin.

[Embodiment of Forming a Nanocapsule]

10 grams of fluorine-based nematic liquid crystal, 1.5 grams of Takenate D-110N (solid content of 75%, Mitsui Chemical Polyurethane), and 0.5 grams of PEO-PPO-PEO block copolymer pluronic 10R5 (Pluronics® 10R5, BASF corporation) as an additive are mixed to form a oil phase.

The oil-phase mixture is put in 5 wt % polyvinyl alcohol (PVA-217, partially-hydrolyzed, 88%, Kuraray corporation) aqueous solution 200 ml, and pre-emulsification is conducted using a homogenizer. Then, a second emulsification is conducted using a high-pressure homogenizer so that liquid crystal droplets are formed to have an average particle size of 100 nanometers to 200 nanometers.

The emulsified solution for which the second emulsification is conducted is moved to a chemical reactor, and then 5 grams of polyallylamine (PAA, 20% aqueous solution, Mw: 17,000, Sigma-Aldrich corporation) as high molecular weight polyallylamine and 2.5 grams of ethylene diamine (EDA, 10% aqueous solution, Mw: 60, Sigma-Aldrich corporation) as low molecular weight polyallylamine are slowly added. After the above polyamines are all added, a chemical reaction is conducted for about 2 hours or more in a state of a temperature of the chemical reactor being raised to 70 degrees Celsius to form a nanocapsule of polyurea.

Then, by lowering the temperature of the chemical reactor to a room temperature, forming the nanocapsule of polyurea is finished.

[Embodiment of Forming a Buffer Layer_ Waterborne Binder (Polyurethane)]

A chemical reactor, which includes a mechanical stirrer, a thermometer, and an inlet for nitrogen, has a 500 ml capacity, and can be temperature-controlled, is prepared. Then, 21 grams of H12MDI (4,4'-Methylene dicyclohexyl diisocyanate) of Bayer corporation, 50 grams of PPO (polypropylene glycol diol) of Sigma-Aldrich corporation, and 0.04 grams of dibutyltin dilaurate of Sigma-Aldrich corporation are put in the chemical reactor, then a temperature of the reactor is raised to 90 degrees Celsius with stirring and a chemical reaction is performed for about 2 hours.

Then, 3.5 grams of DMPA (2,2-bis(hydroxymethyl)propionic acid) of Sigma-Aldrich corporation, and 10 grams of NMP (1-methyl-2-pyrrolidinone) of Sigma-Aldrich corporation are added and reacted at 90 degrees Celsius for 1 hour or more to form NCO-terminated prepolymer. Then, a temperature of the chemical reactor is lowered to 70 degrees Celsius, and then 2.4 grams of TEA (triethylamine) of Sigma-Aldrich corporation is added.

In this state, carboxylic acid is added for 30 minutes for neutralization. Then, a temperature of the chemical reactor is lowered to 35 degrees Celsius, Then, 120 grams of distilled water is added to change prepolymer to waterborne polyurethane. After this process, chain extension process is conducted by adding 3.3 grams of hexamethylenediamine of Sigma-Aldrich corporation dissolved in a small quantity of distilled water and performing a chemical reaction for 1 hour or more. Finally, the temperature of the chemical reactor is raised to 70 degrees Celsius, and all isocyanate remaining in the waterborne polyurethane solution is reacted.

[Embodiment of Forming a Buffer Layer_ Amino Binder]

3.0M formalin (37%) of Sigma-Aldrich corporation and 1.0M melamine of Sigma-Aldrich corporation are mixed in a 4-neck flask, which has a stirrer attached thereto and can be temperature-controlled, and pH is set to 7.2 using NaOH.

Then, a temperature of a chemical reactor is raised to 60 degrees Celsius, and a chemical reaction is performed for about 30 minutes. Then, pH is raised to 9.0 and a chemical reaction is performed for about 1 hour until a solution becomes transparent.

In this process, in the instance that the chemical reaction is very long, degree of polymerization increases and viscosity is rapidly raised. Accordingly, at proper time, the chemical reaction is made not to progress any more, or is made to stop.

In the LCD 100 including the nanocapsule liquid crystal layer 200 of the first embodiment, the nanocapsule 230 is formed to have oil-solubility, and further, the buffer layer 210 is also formed to have oil-solubility. Thus, the nanocapsule liquid crystal layer 200 can have a property of being strong or resistant to moisture.

Accordingly, reduction of reliability of the LCD 100 can be prevented, and reduction of voltage holding ratio can be prevented.

Accordingly, reduction of overall brightness of the LCD 100 or flicker phenomenon of the LCD 100 can be prevented.

In other words, securing property of voltage holding ratio is required in order to normally operate the nanocapsule liquid crystal layer 200 in operation of the thin film transistor T, and the voltage holding ratio refers to a degree that holds a voltage charged in the liquid crystal panel 110 when a voltage being applied to the liquid crystal panel 110.

The liquid crystal panel 110 is applied alternately with a voltage of positive polarity and a voltage of negative polarity. Thus, there is a problem of a holding ratio of a voltage charged in the liquid crystal panel 110 being reduced because of a high leakage current caused by spontaneous polarization that is a basic property of ferroelectric liquid crystal. Accordingly, when driving an LCD at 60 Hz, it is difficult to continuously hold position for the liquid crystal panel 100 to transmit light Accordingly, a time to hold a liquid crystal director for light transmission is reduced, light transmittance is reduced, and overall brightness is reduced.

The voltage holding ratio (VHR) is defined as the below formula (1):

$$VHR = \frac{\rho\varepsilon\left(1 - \theta^{\frac{-T}{\tau}}\right)}{T}, \tau = \rho\varepsilon$$

In the formula (1), $\rho$ is a specific resistance of a liquid crystal, $\in$ is a specific dielectric constant of the liquid crystal, and T is 1/f (f: measured frequency).

Referring to the formula (1), the voltage holding ratio is improved as the specific resistance increases.

When an external moisture or ionic impurity is penetrated into a liquid crystal layer, a specific resistance of a liquid crystal is reduced, and a voltage holding ratio is reduced.

Accordingly, in order to verify and improve reliability of an LCD, an understanding of a voltage holding ratio property is required.

In the LCD 100 of this embodiment, the nanocapsule 230 is formed to have oil-solubility, and further, the buffer layer 210 is also formed to have oil-solubility. Thus, penetration of moisture into the nanocapsule liquid crystal layer 200 from the outside can be prevented.

Accordingly, reduction of reliability of the LCD 100 can be prevented, and reduction of the voltage holding ratio can be prevented. This means that reduction of overall brightness of the LCD 100 can be prevented.

The nanocapsule liquid crystal layer 200 is formed by being coated on the substrate 101 having the thin film transistor T and then being hardened. The coating method may be one of a bar coating method, a gravure coating method, a knife coating method, a roll coating method, a slot die coating method, a reverse coating method, and an inject coating method.

To do this, the nanocapsule 230 and the buffer layer 210 are mixed at a certain ratio for the coating. An occupied volume of the nanocapsules 230 in the nanocapsule liquid crystal layer 200 may be 5% to 95%, and preferably, be 25% to 65% while the buffer layer 210 occupies the rest, for example.

Further, a thickness of the nanocapsule liquid crystal layer 200 may be 1 micrometers to 10 micrometers, and preferably, be 2 micrometers to 5 micrometers, for example.

Further, after coating the nanocapsule liquid crystal layer 200 on the substrate 101, it is preferable that a drying process to evaporate a solvent (water) in the nanocapsule liquid crystal layer 200 is conducted, for example.

In the drying process, a temperature is properly 50 degrees to 150 degrees Celsius, and preferably, 60 degrees to 100 degrees Celsius, for example.

Second Embodiment

Figure 4:
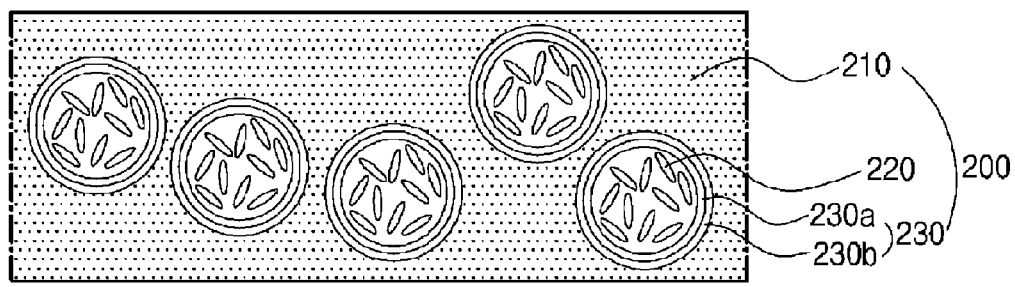
FIG. 4 is a schematic view illustrating a nanocapsule liquid crystal layer according to a second embodiment of the present invention.

FIG. 4 is a schematic view illustrating a nanocapsule liquid crystal layer according to a second embodiment of the present invention. Explanations of parts similar to parts of the first embodiment will be omitted.

Referring to FIG. 4, liquid crystal molecules 220 of the nanocapsule liquid crystal layer 200 are capsuled by a dual nanocapsule 230 of nanosize or nanoscale, and the liquid crystal molecules 220 are irregularly arranged within the nanocapsule 230. The nanocapsules 230 are dispersed in a buffer layer 210 of oil-solubility.

The dual nanocapsule 230 includes an inner shell 230a and an outer shell 230b that are made of polymer material. The inner shell 230a may be made of a water-soluble polymer having a soft property, for example, gelatin, arabic gum, polyvinyl alcohol, or the like.

The outer shell 230b may be made of an oil-soluble polymer, for example, amino resin, polyamide-epichlorohydrin resin, formaldehyde resin, or a mixture thereof.

The dual nanocapsule 230 may be produced by first forming the inner shell 230a and then forming the outer shell 230b. This dual nanocapsule 230 of a dual-shell type nanocapsule is easier in adjusting anchoring energy and has a better solvent-resistant property than a single-shell type nanocapsule.

Particularly, since the outer shell 230b of the dual nanocapsule 230 is oil-soluble, the nanocapsule liquid crystal layer 200 has a moisture-resistant property.

Accordingly, since the nanocapsule 230 has the dual-shell type with oil-solubility and is dispersed in the oil-soluble buffer layer 210, even when moisture is penetrated, reduction of reliability of the LCD can be prevented.

Thus, reduction of a voltage holding ratio can be prevented, and reduction of overall brightness can be prevented.

[Embodiment of Forming a Dual Nanocapsule]

0.5 grams of pluronic 10R5 as an additive is put in 10 grams of nematic liquid crystal that is a fluorinate liquid crystal mixture, is then mixed with 5 wt % ionic polyvinyl alcohol (KL-506, 80% hydrolysis, Kuraray) aqueous solution 200 ml, and then a first emulsification is conducted at a room temperature (20 degrees Celsius) using a homogenizer.

Then, a second emulsification is conducted using a high pressure homogenizer (M-110, Microfluidizer) so that liquid crystal droplets are formed to have an average particle size of 100 nanometers to 200 nanometers. Then, the emulsified solution is moved to a temperature-controlled chemical reactor.

Then, a temperature of the chemical reactor is raised to 50 degrees Celsius, and polyvinyl alcohol polymers dissolved in an aqueous solution form an inner shell through a phase separation process for about 2 hours. Then, the temperature of the chemical reactor is lowered to a room temperature, 5 grams of epichlorohydrin (99%) of Aldrich corporation as a cross-linking agent is added, a cross-linking reaction is conducted, and thus a process of forming an inner-shell is finished.

Separately from the above process, 0.1M melamine of Aldrich and 0.3M formaldehyde of Aldrich are mixed and stirred at 60 degrees Celsius for about 1 hour to form a transparent amino resin i.e., methylolmelamine prepolymer. The 10 ml of prepolymer formed above is slowly added to a solution where the process of forming the inner shell is finished, pH is set to 4.5 using an acetic acid, and a chemical reaction is conducted at 50 degrees Celsius for 4 hours or more.

Setting the pH is performed in order for the prepolymer to form an outer shell, and negative ionic polyvinyl alcohol polymer and positive ionic amino resin pulls each other due to an electrostatic force to form the outer shell.

Then, in a state of lowering to a room temperature (20 degrees Celsius), 5 grams of glutaraldehyde (40%) of Aldrich corporation as a cross-linking agent is added in order to strengthen stability of the outer shell, a process of forming an outer shell is finished, and a process of forming a dual nanocapsule is finished.

As described above, in the LCD including the nanocapsule layer 200 of the second embodiment, the nanocapsule 230 is formed in dual type to have oil-solubility, and further, the buffer layer 210 is also formed to have oil-solubility. Thus, the nanocapsule layer 200 can have a property strong or resistant to moisture.

Accordingly, reduction of reliability of the LCD can be prevented, and reduction of the voltage holding ratio can be prevented.

Accordingly, reduction of overall brightness of the LCD due to reduction of a voltage holding ratio can be prevented.

Table 1 is an experimental result that measures and compares a voltage holding ratio of the second embodiment and a voltage holding ratio of an instance using an usual nanocapsule liquid crystal layer.

TABLE 1

| Material of nanocapsule | Material of buffer layer | Voltage holding ratio (VHR) | | |
|---|---|---|---|---|
| | | Room temp. (25 degrees) | High temp. (60 degrees) | After high temp. and high humidity test (24 hours) |
| Polyvinyl alcohol (PVA) | PVA | 82% | 72% | 0.3% |
| Dual nanocapsule | PU | 94% | 91% | 84% |
| Dual nanocapsule | PVA + amino resin | 84% | 80% | 76% |
| Dual nanocapsule | amino resin | 83% | 81% | 86% |
| — | PVA | 95% | 84% | 0.5% |
| — | PU | 95% | 92% | 91% |
| — | amino resin | 94% | 91% | 85% |

The voltage holding ratio is measured at a room temperature environment (25 degrees Celsius), a high temperature environment (60 degrees Celsius, 2 hours), and high temperature and high humidity environment (60 degrees, 90% RH, 24 hours) with a driving condition of ±1V, 60 Hz using a Model 6254 as a VHR apparatus of Toyo corporation.

A voltage holding ratio of 70% or more in an environment of 60 degrees Celsius should be used to apply to an LCD, and maintaining a voltage holding ratio at 70% or more in an environment of high temperature and high humidity should be utilized to secure reliability. Preferably, 80% VHR or more in an environment of high temperature and high humidity should be used, for example.

In the table 1, the dual nanocapsule 230 has the inner shell 230a made of water-soluble polymer, and the outer shell 230b of oil-soluble polymer.

In the instance of using a water-soluble nanocapsule (PVA) and a water-soluble buffer layer (PVA), a voltage holding ratio is obtained to some extent at room temperature and high temperature, but is greatly lowered to a level of 0.3% in a high temperature and high humidity environment.

This is because the nanocapsule and the buffer layer are all made of a water-soluble material, thus a large amount of moisture is penetrated, and thus a voltage holding ratio is deteriorated.

In the instance of the dual nanocapsule 230 having the outer shell 230b made of oil-soluble polymer, without regard to kinds of the buffer layer 210, the voltage holding ratio of 75% or more is obtained.

This is because, except for an instance of the buffer layer 210 made of PVA+amino resin, the nanocapsule 230 and the buffer layer 210 are all made of an oil-soluble material, and thus penetration of moisture is almost impossible.

Even though the buffer layer 210 is made of the water-soluble material of PVA+amino resin, the voltage holding ratio is measured high in an environment of high temperature and high humidity. This is because PVA and amino are reacted and ion-bonded, and thus, a property of PVA changes and the buffer layer 210 is oil-soluble on the whole.

For additional comparison, a result measuring voltage holding ratios of only buffer layers shows that a voltage holding ratio of a buffer layer made of water-soluble PVA is reduced rapidly in an environment of high temperature and high humidity while a buffer layer made of amino resin and polyurethane of an oil-soluble binder has an excellent voltage holding ratio without respect to environments.

In other words, by forming the dual nanocapsule 230 of oil-solubility and further dispersing the dual nanocapsule 230 in the buffer layer 210 of oil-solubility, the voltage holding ratio of the nanocapsule layer 200 is not reduced even in high temperature and high humidity environment. This is because the nanocapsule 230 and the buffer layer 210 are both oil-soluble and thus the nanocapsule liquid crystal layer 200 has a property strong or resistant to moisture.

Accordingly, reduction of overall brightness of the LCD can be prevented.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a substrate having a pixel electrode and a common electrode formed thereon;
a first polarizing plate on a bottom surface of the substrate, and having a polarizing axis of a first direction;
a nanocapsule liquid crystal layer on the pixel electrode and the common electrode, and including a buffer layer and nanocapsules, each nanocapsule being filled with liquid crystal molecules, being oil-soluble, and being dispersed in the buffer layer; and
a second polarizing plate on the nanocapsule liquid crystal layer, and having a polarizing axis of a second direction perpendicular to the first direction,
wherein the buffer layer is oil-soluble, and
wherein the buffer layer is made of a mixture of an oil-soluble resin binder and a water-soluble binder.

2. The device of claim 1, wherein the oil-soluble resin binder is an acrylic resin.

3. The device of claim 1, wherein the water-soluble binder is selected from a water-soluble alkyd resin, a water-soluble acryl-modified alkyd resin, a water-soluble oil-free alkyd resin, a water-soluble polyester resin, a water-soluble acrylic resin, a water-soluble epoxy ester resin, or a water-soluble melamine resin.

4. The device of claim 1, wherein the nanocapsule is made of polyurethane or polyurea.

5. The device of claim 1, wherein the nanocapsule is made of an amino resin.

6. The device of claim 1, wherein the nanocapsule is made of polymethyl methacrylate.

7. The device of claim 1, wherein the nanocapsule includes an inner shell enclosing the liquid crystal molecules, and an outer shell enclosing the inner shell.

8. The device of claim 7, wherein the outer shell is oil-soluble, and includes at least one of an amino resin, a polyamide-epichlorohydrin resin, and a formaldehyde resin.

9. The device of claim 7, wherein the inner shell is made of polyvinyl alcohol, and the outer shell is made of an amino resin.

10. A liquid crystal display device comprising:
a substrate having a pixel electrode and a common electrode formed thereon;
a non-liquid layer on the substrate, and including a buffer layer and nanocapsules, each nanocapsule being filled with liquid crystal molecules, being oil-soluble, and being dispersed in the buffer layer; and
a polarizing plate on the non-liquid layer,
wherein the buffer layer is oil-soluble, and
wherein the buffer layer is made of a mixture of an oil-soluble resin binder and a water-soluble binder.

11. The device of claim 10, further comprising another polarizing plate on a bottom surface of the substrate and having a polarizing axis of a first direction,
wherein the polarizing plate has a polarizing axis of a second direction perpendicular to the first direction.

12. The device of claim 10, wherein the water-soluble binder is selected from a water-soluble alkyd resin, a water-soluble acryl-modified alkyd resin, a water-soluble oil-free alkyd resin, a water-soluble polyester resin, a water-soluble acrylic resin, a water-soluble epoxy ester resin, or water-soluble melamine resin.

13. The device of claim 10, wherein the nanocapsules are made of at least one of polyurethane, polyurea, amino resin, and polymethyl methacrylate.

14. The device of claim 10, wherein the nanocapsules include an inner shell enclosing the liquid crystal molecules, and an outer shell enclosing the inner shell.

15. The device of claim 14, wherein the outer shell is oil-soluble, and includes at least one of an amino resin, a polyamide-epichlorohydrin resin, and a formaldehyde resin, and
wherein the inner shell is made of polyvinyl alcohol.

16. The device of claim 10, wherein the oil-soluble resin binder is an acrylic resin.

* * * * *